United States Patent
Salvatora et al.

(10) Patent No.: US 10,850,716 B2
(45) Date of Patent: Dec. 1, 2020

(54) SYSTEM AND METHOD FOR CONTROLLING AN AUTOMATED BRAKING APPLICATION

(71) Applicant: Bendix Commercial Vehicle Systems LLC, Elyria, OH (US)

(72) Inventors: Randy J Salvatora, Federal Way, WA (US); Michael D Tober, Avon, OH (US); Nicholas A Broyles, North Ridgeville, OH (US); Andrew J Pilkington, Avon Lake, OH (US); David W Howell, Oak Ridge, NC (US); Thomas S Miller, Jr., Lagrange, OH (US); Daniel T Boyce, Akron, OH (US); Parth Kalra, Elyria, OH (US); Subashish Sasmal, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/994,482

(22) Filed: May 31, 2018

(65) Prior Publication Data

US 2020/0017080 A1    Jan. 16, 2020

(51) Int. Cl.
*B60T 7/22* (2006.01)
*B60T 8/17* (2006.01)
(Continued)

(52) U.S. Cl.
CPC .............. *B60T 7/22* (2013.01); *B60T 8/17* (2013.01); *B60T 8/321* (2013.01); *B60T 13/26* (2013.01);
(Continued)

(58) Field of Classification Search
CPC ... B60T 7/22; B60T 8/17; B60T 8/321; B60T 13/26; B60T 13/683; B60T 8/17554;
(Continued)

(56) References Cited

U.S. PATENT DOCUMENTS

| 4,300,805 A | 11/1981 | Reinecke |
| 4,586,755 A | 5/1986 | Worbois |

(Continued)

FOREIGN PATENT DOCUMENTS

| CN | 206537272 U | 10/2017 |
| DE | 102008003381 A1 | 7/2009 |

(Continued)

OTHER PUBLICATIONS

Notification of Transmittal of the International Search Report and the Written Opinion of the International Searching Authority for counterpart International Appln. No. PCT/US2019/034823, dated Sep. 23, 2019, 1 page.

(Continued)

*Primary Examiner* — Anne Marie Antonucci
*Assistant Examiner* — Andrew J Cromer
(74) *Attorney, Agent, or Firm* — Brian Kondas; Cheryl Greenly; Eugene Clair

(57) ABSTRACT

A controller comprises an electronic communication line configured to receive a system brake request control signal representing a requested system brake application and an identified urgency. A hardware processor, configured to perform a predefined set of basic operations in response to receiving the system brake request control signal, is capable of: determining a maximum braking pressure to be applied during the system braking application based on the identified urgency; generating a first system brake mode control signal, based on the determined maximum braking pressure, to set an associated first valve to a first valve state; generating a second system brake mode control signal, based on the determined maximum braking pressure, to set an associated second valve to a second valve state, the maximum braking pressure during the system braking application being set by the first valve state and the second valve state; determining (Continued)

an activation profile for an associated modulator based on the determined maximum braking pressure; the controller transmitting, via the electronic communication line, the first system brake mode control signal, the second system brake mode control signal and modulator control signals according to the activation profile.

25 Claims, 2 Drawing Sheets

(51) Int. Cl.
  *B60T 8/32* (2006.01)
  *B60T 13/26* (2006.01)
  *B60T 13/68* (2006.01)

(52) U.S. Cl.
  CPC ......... *B60T 13/683* (2013.01); *B60T 2250/04* (2013.01)

(58) Field of Classification Search
  CPC .......... B60T 13/662; B60T 7/042; B60T 7/12; B60T 8/3275
  See application file for complete search history.

(56) References Cited

U.S. PATENT DOCUMENTS

| | | | |
|---|---|---|---|
| 4,770,470 A | 9/1988 | Tarumizu et al. | |
| 4,819,998 A | 4/1989 | Goebels et al. | |
| 6,260,934 B1 | 7/2001 | Lee | |
| 8,708,430 B2 | 4/2014 | Bensch et al. | |
| 9,630,602 B2 | 4/2017 | Wuerth et al. | |
| 9,713,959 B2 | 7/2017 | Poppe | |
| 9,776,611 B2 | 10/2017 | Lenz et al. | |
| 2002/0011366 A1* | 1/2002 | Fuchs | B60T 7/12 180/167 |
| 2003/0225499 A1* | 12/2003 | Holler | B60R 21/0132 701/71 |
| 2007/0273201 A1 | 11/2007 | Scherrer et al. | |
| 2015/0375720 A1 | 12/2015 | Leoka et al. | |
| 2018/0354483 A1 | 12/2018 | Hanslik | |

FOREIGN PATENT DOCUMENTS

| | | |
|---|---|---|
| EP | 0616931 A1 | 9/1994 |
| EP | 1069017 A2 | 1/2001 |
| EP | 1069016 B1 | 4/2004 |
| EP | 1464555 B1 | 12/2009 |
| JP | 2009149111 A | 7/2009 |
| WO | 2016124332 A1 | 8/2016 |
| WO | 2017088952 A1 | 6/2017 |
| WO | 2017108148 A1 | 6/2017 |
| WO | 2017190820 A1 | 11/2017 |

OTHER PUBLICATIONS

Information on Search Strategy for counterpart International Appln. No. PCT/US2019/034823, dated Sep. 23, 2019, 1 page.
International Search Report counterpart International Appln. No. PCT/US2019/034823, dated Sep. 23, 2019, 3 pages.
Written Opinion for counterpart International Appln. No. PCT/US2019/034823, dated Sep. 23, 2019, 10 pages.

* cited by examiner

SYSTEM AND METHOD FOR CONTROLLING AN AUTOMATED BRAKING APPLICATION

BACKGROUND

The present invention relates to automated braking systems. It finds particular application in conjunction with automated braking systems used with autonomous cruise control (ACC) systems and will be described with particular reference thereto. It will be appreciated, however, that the invention is also amenable to other applications.

Autonomous cruise control (ACC), also called adaptive cruise control, is a dynamic cruise control system using radar and/or video systems on an associated vehicle to identify objects, including other vehicles, in the associated vehicle's path ahead. The ACC automatically adjusts the associated vehicle's speed to maintain a safe distance to the objects ahead (e.g., forward objects). At times, in order to maintain the safe distance to a forward object, the ACC causes the associated vehicle's service brakes to engage.

Some ACC initiated brake applications are non-emergency braking events that merely request an automated braking system (e.g., an antilock braking system) on the associated vehicle to gradually (e.g., less aggressively) decelerate (e.g., $\geq -2.5$ m/s$^2$) the associated vehicle. It is generally desirable for the automated braking system to not decelerate the associated vehicle at a greater rate of deceleration (e.g., $-4$ m/s$^2$) when only a gradual deceleration (e.g., $\geq -2.5$ m/s$^2$) is requested by the ACC. For example, system initiated vehicle decelerations that are more aggressive than a gradual deceleration may startle an operator of the associated vehicle, which may lead to operator dissatisfaction with the ACC system. Since gradual decelerations generally result in a smoother (e.g., less jerky) deceleration, gradual decelerations initiated by the ACC are sometimes referred to as comfort-focused system braking (comfort braking).

Current ACC systems use modulators to reduce full system pressure (e.g., between ~110 psi and ~130 psi and, in one particular example, ~120 psi) available on the associated vehicle at least down to a comfort braking threshold pressure (e.g., $\leq$~80 psi, and in one particular example $\leq$~55 psi) to achieve comfort braking.

The present invention provides a new and improved apparatus and method for achieving comfort braking.

SUMMARY

In one aspect of the present invention, it is contemplated that a controller comprises an electronic communication line configured to receive a system brake request control signal representing a requested system brake application and an identified urgency. A hardware processor, configured to perform a predefined set of basic operations in response to receiving the system brake request control signal, is capable of: determining a maximum braking pressure to be applied during the system braking application based on the identified urgency; generating a first system brake mode control signal, based on the determined maximum braking pressure, to set an associated first valve to a first valve state; generating a second system brake mode control signal, based on the determined maximum braking pressure, to set an associated second valve to a second valve state, the maximum braking pressure during the system braking application being set by the first valve state and the second valve state; determining an activation profile for an associated modulator based on the determined maximum braking pressure; the controller transmitting, via the electronic communication line, the first system brake mode control signal, the second system brake mode control signal and modulator control signals according to the activation profile.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
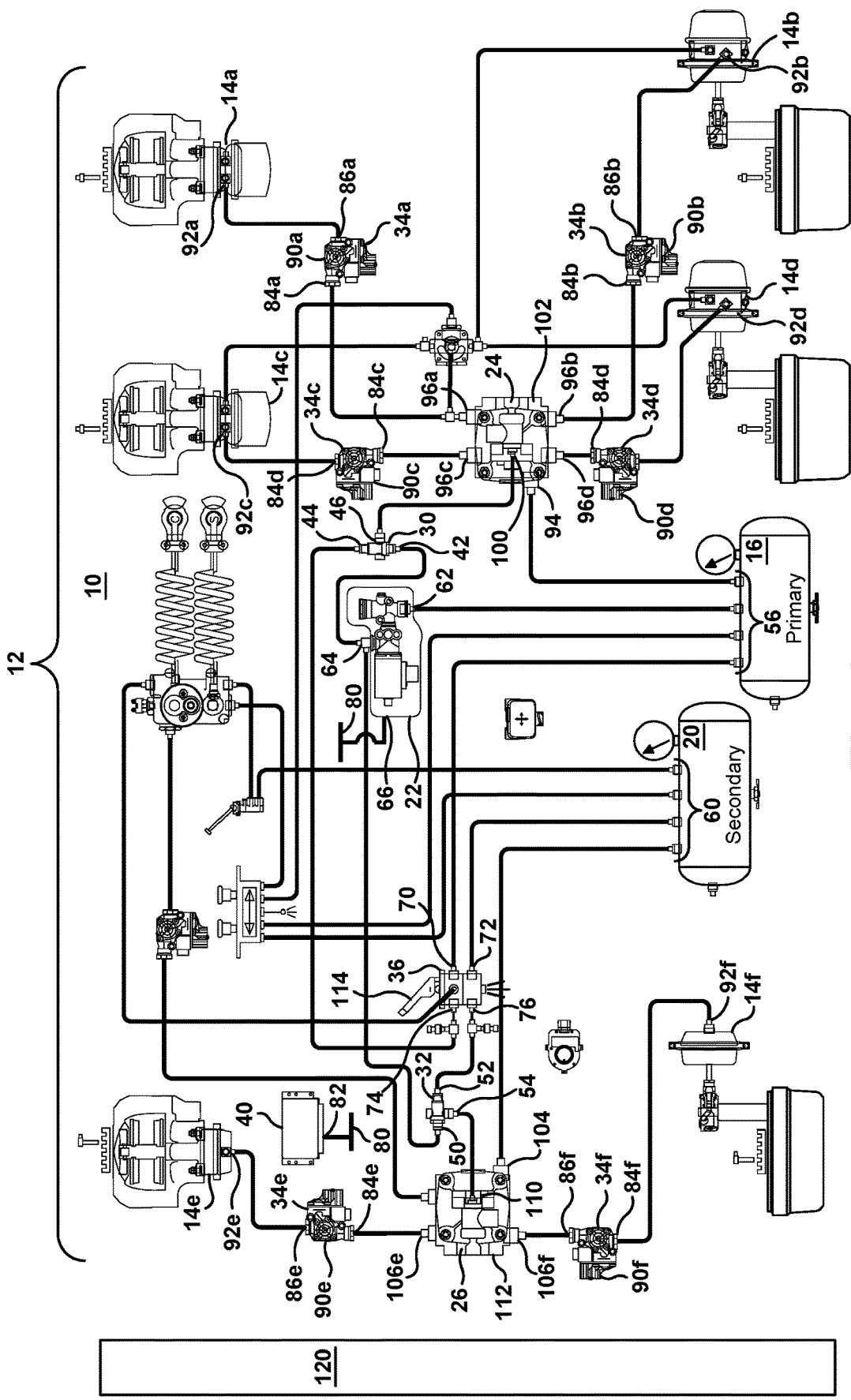
FIG. 1 illustrates a schematic representation of a braking system in accordance with one embodiment of an apparatus illustrating principles of the present invention.

With reference to FIG. 1, a simplified component diagram of an exemplary brake system 10 on an associated vehicle 12 is illustrated in accordance with one embodiment of the present invention. In the illustrated embodiment, the brake system 10 is a pneumatic (e.g., air) brake system. The system 10 includes at least one service brake $14_{a,b,c,d,e}$, (collectively 14), a first reservoir 16, a second reservoir 20, a control valve 22, a first relay valve 24, a second relay valve 26, a first shuttle valve 30, a second shuttle valve 32, at least one modulator valve $34_{a,b,c,d,e,f}$ (collectively 34), an operator controlled brake demand valve 36 (e.g., a foot brake valve) and an electronic control unit (ECU) 40 (e.g., controller).

The first and second reservoirs 16, 20 store pneumatic fluid (e.g., air) at a full system pressure (e.g., between ~110 psi and ~130 psi and, in one particular example, ~120 psi). As is commonly understood, the pneumatic fluid in the reservoirs 16, 20 is replenished by a compressor (not shown) as it is used.

The first shuttle valve 30 includes first and second supply ports 42, 44 and a delivery port 46; and the second shuttle valve 32 includes first and second supply ports 50, 52 and a delivery port 54. The higher of the two (2) pneumatic pressures at the first and second supply ports 42, 44, respectively, of the first shuttle valve 30 is fluidly communicated to the delivery port 46 of the first shuttle valve 30. Similarly, the higher of the two (2) pneumatic pressures at the first and second supply ports 50, 52, respectively, of the second shuttle valve 32 is fluidly communicated to the delivery port 54 of the second shuttle valve 32.

The first and second reservoirs 16, 20 include respective delivery ports 56, 60. The control valve 22 includes a pneumatic supply port 62, a pneumatic delivery port 64 and an electronic control port 66.

The foot brake valve 36 includes first and second supply ports 70, 72, respectively, and first and second delivery ports 74, 76, respectively. The first supply port 70 of the foot brake valve 36 fluidly communicates with the delivery port 56 of the first reservoir 16. The second supply port 72 of the foot brake valve 36 fluidly communicates with the delivery port 60 of the second reservoir 20. The first delivery port 74 of the foot brake valve 36 fluidly communicates with the second supply port 44 of the first shuttle valve 30. The second delivery port 76 of the foot brake valve 36 fluidly communicates with the second supply port 52 of the second shuttle valve 32.

The delivery port 56 of the first reservoir 16 fluidly communicates with the supply port 62 of the control valve 22. The delivery port 64 of the control valve 22 fluidly communicates with the first supply port 42 of the first shuttle valve 30; the delivery port 64 of the control valve 22 also fluidly communicates with the first supply port 50 of the second shuttle valve 32. The control port 66 of the control valve 22 electrically communicates with the ECU 40 via, for example, a vehicle communication bus 80 (e.g., a J1939 communication bus). For ease of illustration, only a portion of the vehicle communication bus 80 is shown.

The ECU 40 electronically communicates with the vehicle communication bus 80 via an electronic ECU communication line (e.g., wire) 82.

The control valve 22 is set to one of a plurality of states based on an electronic control signal received from the ECU 40, via the bus 80, at the control port 66. In one embodiment, the control valve 22 is set to either a closed (e.g., first) state or an open (e.g., second) state. During the closed state, the supply port 62 does not fluidly communicate with the delivery port 64. During the open state, the supply port 62 fluidly communicates with the delivery port 64, but reduces the pressure of the pneumatic fluid received at the supply port 62 before the pneumatic fluid reaches the delivery port 64. For example, the control valve 22 reduces the pressure of the pneumatic fluid at the supply port 62 from the full system pressure to a reduced pressure that is delivered by the delivery port 64. It is contemplated that the reduced pressure is ≤~80 psi, and in one particular example ≤~55 psi.

In one embodiment, the control valve 22 is a normally closed valve, in other words, the default state of the control valve 22 is the closed state. In this embodiment, the control valve 22 remains in the closed state as long as no control signal is actively being received at the control port 66. The control valve 22 only switches to, and remains in, the open state while the control signal is actively being received at the control port 66. Otherwise, with no control signal present at the control port 66, the control valve 22 is in the closed state.

Each of the modulators $34_{a,b,c,d,e,f}$ includes respective pneumatic supply ports $84_{a,b,c,d,e,f}$ (collectively, 84), respective pneumatic delivery ports $86_{a,b,c,d,e,f}$ (collectively, 86) and respective electronic control ports $90_{a,b,c,d,e,f}$ (collectively, 90). The electronic control ports 90 electronically communicate with the ECU 40 via the vehicle communication bus 80.

The supply ports 84 fluidly communicate with the respective delivery ports 86 based on the electronic modulator control signals at the respective control ports 90. For example, the unrestricted pneumatic pressure of the fluid at the supply ports 84 is fluidly communicated to the respective delivery ports 86 when the electronic modulator control signals are present at the respective control ports 90. Conversely, the supply ports 84 do not fluidly communicate with the respective delivery ports 86 when the electronic modulator control signals are not present at the respective control ports 90.

The modulator delivery ports $86_{a,b,c,d,e,f}$ fluidly communicate with the service brakes $14_{a,b,c,d,e,f}$ via respective service brake supply ports $92_{a,b,c,d,e,f}$. The service brakes $14_{a,b,c,d,e,f}$ are actuated based on the level of pneumatic pressure at respective service brake supply ports $92_{a,b,c,d,e,f}$.

The first relay valve 24 includes a pneumatic supply port 94, at least one pneumatic delivery port $96_{a,b,c,d,e,f}$ (collectively, 96), a pneumatic control port 100 (e.g., a delivery control port) and an electronic control port 102 (e.g., a state control port). The supply port 94 fluidly communicates with the delivery port 56 of the first reservoir 16. The delivery ports $96_{a,b,c,d,e,f}$ fluidly communicate with the respective modulator supply ports $84_{a,b,c,d,e,f}$. The pneumatic control port 100 fluidly communicates with the delivery port 46 of the first shuttle valve 30. The electronic control port 102 electronically communicates with ECU 40 via the bus 80.

The first relay valve 24 is set to one of a plurality of states based on an electronic control signal received from the ECU 40, via the bus 80, at the electronic control port 102 (e.g., state control port). In one embodiment, the first relay valve 24 is set to either a full system pressure (e.g., first) state or a proportional pressure (e.g., second) state. During the full system pressure (e.g., first) state, the supply port 94 fluidly communicates with the delivery port 96 unrestricted so that the full pressure at the supply port 94 is communicated to the delivery port 96. During the proportional pressure (e.g., second) state (e.g., a reduced pressure state), the supply port 94 fluidly communicates with the delivery port 96 based on the pressure at the pneumatic control port 100. For example, a higher pressure at the pneumatic control port 100 results in a higher pressure at the delivery port 96. The first relay valve 24 is normally set to the proportional pressure (e.g., second) state and is only set to the full system pressure (e.g., first) state when the electronic control signal is actively being received at the electronic control port 102.

The second relay valve 26 includes a pneumatic supply port 104, at least one pneumatic delivery port $106_{e,f}$ (collectively, 106), a pneumatic control port 110 (e.g., a delivery control port) and an electronic control port 112 (e.g., a state control port). The supply port 104 fluidly communicates with the delivery port 60 of the second reservoir 20. The delivery ports $106_{e,f}$ fluidly communicate with the respective modulator supply ports $84_{e,f}$. The pneumatic control port 110 fluidly communicates with the delivery port 54 of the second shuttle valve 32. The electronic control port 112 electronically communicates with ECU 40 via the bus 80.

The second relay valve 26 is set to one of a plurality of states based on an electronic control signal received from the ECU 40, via the bus 80, at the electronic control port 112. In one embodiment, the second relay valve 26 is set to either a full system pressure (e.g., first) state or a proportional pressure (e.g., second) state (e.g., a reduced pressure state). During the full system pressure (e.g., first) state, the supply port 104 fluidly communicates with the delivery port 106 unrestricted so that the full pressure at the supply port 104 is communicated to the delivery port 106. During the proportional pressure (e.g., second) state, the supply port 104 fluidly communicates with the delivery port 106 based on the pressure at the pneumatic control port 110. For example, a higher pressure at the pneumatic control port 110 results in a higher pressure at the delivery port 106. Like the first relay valve 24, the second relay valve 26 is normally set to the proportional pressure (e.g., second) state and is only set to the full system pressure (e.g., first) state when the electronic control signal is actively being received at the electronic control port 112.

During a normal service braking application, the ECU 40 is not transmitting a control signal to the control valve 22. Therefore, the control valve 22 is in the closed (e.g., first) state. As discussed above, no pneumatic fluid is transmitted to the control valve delivery port 64 during the first state and, consequently, no pneumatic pressure is present at the control valve delivery port 64.

During the normal service braking application, it is assumed the ECU 40 has previously transmitted respective control signals, via the communication line 82, to the first relay electronic control port 102 and the second relay electronic control port 112 to set both of the relay valves 24, 26 to the proportional pressure (e.g., second) state. Therefore, when an operator of the associated vehicle 12 depresses the foot brake valve 36, pneumatic pressure is delivered from the first delivery port 74 of the foot brake valve 36 to the second supply port 44 of the first shuttle valve 30 based on how far a pedal 114 of the foot brake valve 36 is depressed. Similarly, when the operator of the associated vehicle 12 depresses the pedal 114 of the foot brake valve 36, pneumatic pressure is delivered from the second delivery port 76 of the foot brake valve 36 to the second supply port 52 of the second shuttle valve 32 based on how far the pedal 114 of the foot brake valve 36 is depressed. It is assumed substantially the same amount of pneumatic pressure is delivered from the first and second foot valve delivery ports 74, 76 when the pedal 114 is depressed a particular distance.

Since the control valve 22 is set to the closed (e.g., first) state during normal service braking, the pneumatic pressure at both of the first supply ports 42, 50 of the first and second shuttle valves 30, 32, respectively, is about zero (0) psi. Therefore, during normal service braking, the higher pressure at both of the first and second shuttle valves 30, 32, respectively, will be at the second supply ports 44, 52—based on the operator demanded braking indicated by how far the pedal 114 is depressed.

Since the relay valves 24, 26 default to the proportional pressure (e.g., second) state, the pneumatic pressure delivered to the delivery ports 96, 106 is proportional to the braking pressure demanded by the operator, which is indicated by how far the pedal 114 is depressed (e.g., between 0 psi and full system pressure, for example between ~110 psi and ~130 psi).

During a typical (e.g., conventional) automated braking event, the control valve 22 is in the closed (e.g., first) state. However, the ECU 40 transmits control signals, via the communication line 82, to both the first relay valve electronic control port 102 and the second relay valve electronic control port 112 to set the first and second relay valves 24, 26, respectively, to full system pressure state. Then, while the first and second relay valves 24, 26 are in the full system pressure state, the ECU 40 transmits control signals, via the communication line 82, to at least one of the modulator control ports 90 according to a first (e.g., typical or conventional automated braking profile) for modulating the full system pressure delivered from the modulator supply port 84 to the modulator delivery port 86 of the at least one modulator 34.

During a reduced pressure automated braking event (e.g., an automated comfort-braking event), the control valve 22 is in the open (e.g., second) state. However, like the normal service braking application, it is assumed the ECU 40 has previously transmitted respective control signals to the first relay electronic control port 102 and the second relay electronic control port 112 to set both of the relay valves 24, 26 to the proportional pressure (e.g., second) state. Since the reduced pressure is delivered by the delivery port 64 to the first supply ports 42, 50 of the first and second shuttle valves 30, 32, the reduced pressure is present at the delivery ports 46, 54 of the first and second shuttle valves 30, 32—assuming the operator of the vehicle 12 does not depress the pedal 114 to demand braking pressure in excess of the reduced pressure. With the reduced pressure delivered to at least one of the modulator supply ports 84, the ECU 40 transmits control signals, via the communication line 82, to at least one of the modulator control ports 90 according to a second (e.g., reduced pressure braking profile) for modulating the full system pressure delivered from the modulator supply port 84 to the modulator delivery port 86 of the at least one modulator 34.

As described above with reference to the typical automated braking event and the reduced pressure automated braking event (e.g., an automated comfort-braking event), the different braking profiles are previously stored in the ECU 40. While the typical automated braking profile is designed for modulating full system pressure at the modulator supply ports 84, the reduced pressure braking profile is designed for modulating reduced pressure (e.g., ≤~80 psi, and in one particular example ≤~55 psi) at the modulator supply ports 84.

Figure 2:
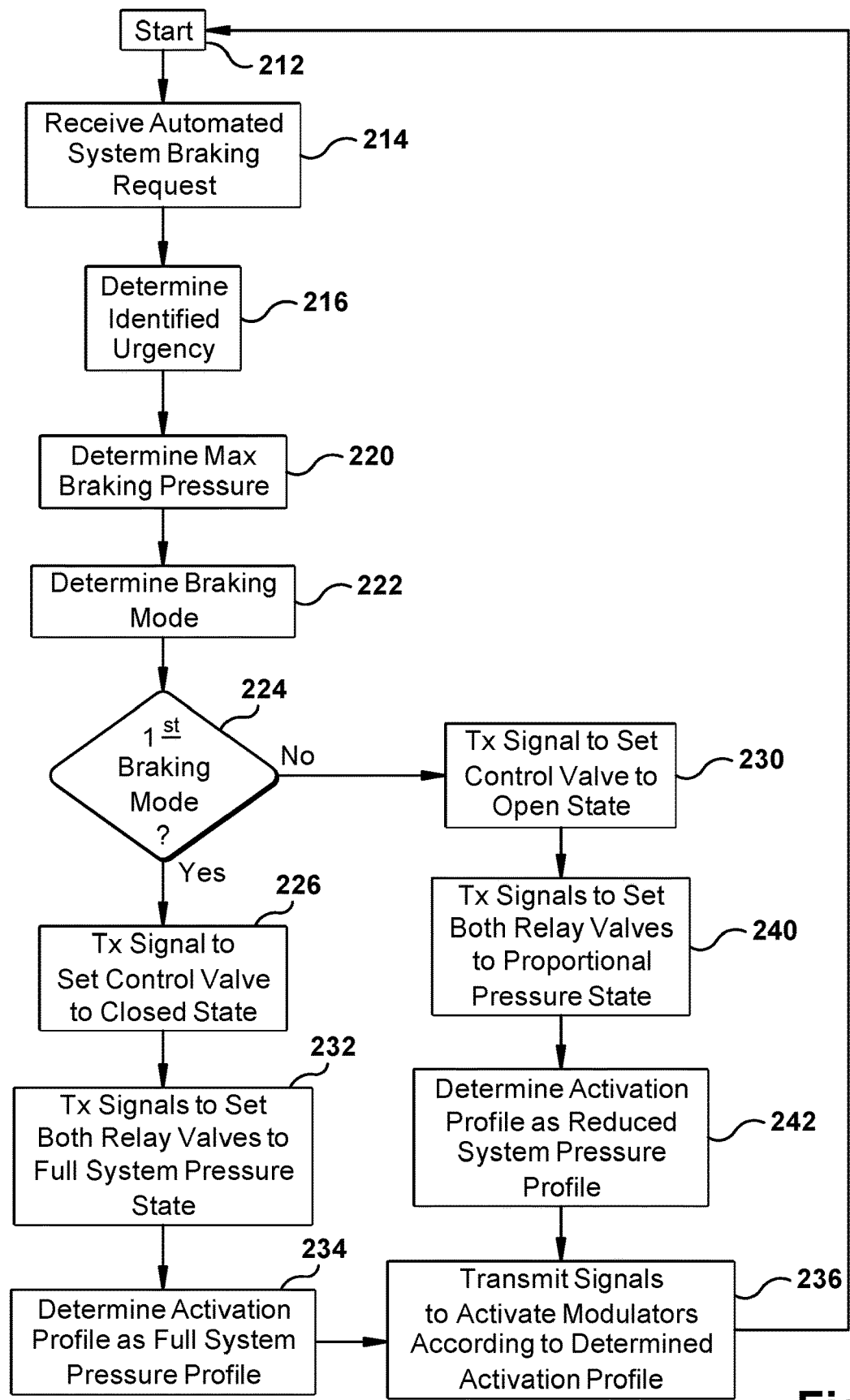
FIG. 2 is an exemplary methodology of controlling the braking system of FIG. 1 in accordance with one embodiment illustrating principles of the present invention.

With reference to FIG. 2, an exemplary methodology of the system shown in FIG. 1 for controlling automated system braking on a vehicle is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, the method begins in a step 212. In a step 214, the ECU 40 receives an automated system braking request from, for example, another controller (e.g., a radar controller, a camera controller, etc.) on the vehicle 12. In one embodiment, the automated system braking request includes (e.g., represents) a requested system brake application and an identified urgency. It is contemplated that the identified urgency is either high urgency or low urgency.

In one embodiment, the identified urgency is based on at least one of a current distance to a forward vehicle 120 and a current relative speed of the vehicle 12 with respect to the forward vehicle 120. For example, if the distance to the forward vehicle 120 is greater than a predetermined distance and the relative speed of the vehicle 12 and the forward vehicle 120 is less than a predetermined speed, the identified urgency will be identified as low. However, if the predetermined distance is greater than the predetermined distance and/or the relative speed of the vehicle 12 and the forward vehicle 120 is greater than the predetermined speed, the identified urgency will be identified as high.

In another embodiment, the identified urgency is based on a current predicted time until the vehicle 12 physically engages the forward vehicle 120. As in the previous embodiment, the time until the vehicle 12 physically engages the forward vehicle 120 is based on at least one of a current distance to the forward vehicle 120 and a current relative speed of the vehicle 12 with respect to the forward vehicle 120.

In a step 216, the identified urgency included in the automated system braking request received in the step 214 is determined.

In a step 220, a maximum braking pressure is determined based on the identified urgency. The maximum braking pressure is the braking pressure to be applied during an automated system braking event to be initiated based on the automated system braking request. If the urgency identified in the request received by the ECU 40 in the step 216 is "high," the maximum braking pressure is determined to be a full system pressure in the step 220. Otherwise, if the urgency identified in the request received by the ECU 40 in the step 216 is "low," the maximum braking pressure is determined to be reduced system pressure in the step 220.

If the maximum braking pressure is determined in the step 220 to be greater than the comfort braking threshold (e.g., ≥~80 psi and up to full system pressure, and in one particular example ≥~55 psi and up to full system pressure), a braking mode is determined, in a step 222, to be a first braking mode. Or, if the maximum braking pressure is determined in the step 220 to be the reduced system pressure, the braking mode is determined in the step 222 to be a second braking mode.

It is contemplated that the first braking mode is used during a typical (e.g., conventional) automated system braking event in which the full system pressure (e.g., between ~110 psi and ~130 psi) is supplied to the modulator supply ports 84 during the automated system braking event (e.g., initiated by the ACC). The second braking mode is sometimes desirable to be initiated by the ACC to achieve the comfort-focused system braking (e.g., comfort braking), if the requested automatic system braking urgency is low, by supplying the reduced system pressure (e.g., ≤~80 psi, and in one particular example ≤~55 psi) to the modulator supply ports 84 during the automated system braking event (e.g., initiated by the ACC). For example, as discussed above, the first braking mode may result in a relatively less gradual (e.g., jerky) deceleration, while the second braking mode may result in a relatively more gradual and smoother (e.g., less jerky) deceleration. The second braking mode may be desirable to gain further acceptance of ACC.

In a step 224, a determination is made whether the first braking mode is selected in the step 222. If it is determined in the step 224 that the first braking mode is selected in the step 222, control passes to a step 226. Otherwise, if it is determined in the step 224 that the first braking mode is not selected in the step 222 (e.g., the second braking mode is selected), control passes to a step 230.

In the step 226, the ECU 40 transmits a signal, via the communication line 82, to the control port 66 of the control valve 22, via the vehicle communication bus 80, to set the control valve 22 to the first (e.g., closed) state. As discussed above, if the control valve 22 is a normally closed valve, the control signal transmitted in the step 226 may be the absence of any signal, which causes the normally closed control valve 22 to remain in the first (e.g., closed) state.

In a step 232, the ECU 40 transmits a signal, via the communication line 82, to the electronic control ports 102, 112 of the respective first and second relay valves 24, 26, via the vehicle communication bus 80, to set both the first and second relay valves 24, 26 to the full system pressure (e.g., first) state.

In a step 234, the ECU 40 determines the activation profile, based on the full system maximum braking pressure of the first braking mode, to be the full system pressure activation profile.

In a step 236, the ECU 40 transmits, via the communication line 82, at least one control signal to at least one of the control ports 90 of the modulators 34, via the vehicle communication bus 80, for actuating the modulators 34 according to the determined activation profile during the automated system braking event. In this case the determined activation profile is the full system pressure activation profile.

Control then returns to the step 212 to restart the process and wait for the next automatic system braking request in the step 214.

If it is determined in the step 224 that the first braking mode is not selected in the step 222 (e.g., the second braking mode is selected), control passes to the step 230 during which the ECU 40 transmits, via the communication line 82, a signal to the control port 66 of the control valve 22, via the vehicle communication bus 80, to set the control valve 22 to the second (e.g., open) state. As discussed above, it is contemplated that the control valve 22 is a normally closed valve and only switches to, and remains in, the second (e.g., open) state while the control signal is being transmitted in the step 226 and received at the control port 66 of the control valve 22.

As discussed above, setting the control valve 22 to the second (e.g., open) state causes the reduced pressure of the pneumatic fluid to be delivered from the delivery port 64 of the control valve 22 to the pneumatic control ports 100, 110 of the respective relay valves 24, 26.

In a step 240, the ECU 40 transmits a signal, via the communication line 82, to the electronic control ports 102, 112 of the respective first and second relay valves 24, 26, via the vehicle communication bus 80, to set both the first and second relay valves 24, 26 to the proportional system pressure (e.g., second) state.

In a step 242, the ECU 40 determines the activation profile, based on the reduced system maximum braking pressure of the second braking mode, to be the proportional (e.g., reduced) system pressure activation profile.

Control then passes to the step 236, during which the ECU 40 transmits, via the communication line 82, at least one control signal to at least one of the control ports 90 of the modulators 34, via the vehicle communication bus 80, for actuating the modulators 34 according to the determined activation profile during the automated system braking event. In this case the determined activation profile is the proportional (e.g., reduced) system pressure activation profile.

Control then returns to the step 212 to start over and wait for the next automatic system braking request in the step 214.

The pressure of the pneumatic fluid received at the modulator supply ports 84 during the second braking mode is less than the pressure of the pneumatic fluid received at the modulator supply ports 84 during the first braking mode. During the second braking mode, the ECU 40 is capable of determining the activation profile as a profile that actuates the modulators 34 to achieve a finer resolution of pressure delivered from the modulator delivery ports 86 than during the first braking mode.

In one embodiment, the control valve 22 is a Bendix Hill Stop Assist (HSA) valve (e.g., Bendix Model AT-3). Also, the relay valves 24, 26 are Bendix Antilock Traction Relay 6 (ATR-6) valves.

As discussed above, lower pneumatic pressures pass through the relay valves 24, 26 and modulators 34 during the second braking mode, which is used by ACC to achieve comfort-focused system braking. These lower pressures reduce wear and tear on the relay valves 24, 26 and modulators 34, thereby extending the durability and life of these components.

Although the embodiments described above utilize the vehicle communication bus 80 for electrically communicating between the ECU 40 and each of the control valve 22, the first relay valve 24, the second relay valve 26 and the modulators 34, other embodiments in which at least one of the control valve 22, the first relay valve 24, the second relay valve 26 and the modulators 34 electrically communicates with the ECU 40 via a respective direct electrical connection (e.g., without communicating through the vehicle bus 80) are also contemplated.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller, comprising:
   an communication line configured to receive a system brake request control signal representing a requested system brake application and an identified urgency;
   a hardware processor, configured to perform a predefined set of basic operations in response to receiving the system brake request control signal, the hardware processor capable of:
     determining a maximum braking pressure to be applied during the system braking application based on the identified urgency;
     generating a first system brake mode electronic control signal, based on the determined maximum braking pressure, to set an associated first valve to a first valve state;
     generating a second system brake mode electronic control signal, based on the determined maximum braking pressure, to set an associated second valve to a second valve state, the maximum braking pressure during the system braking application being set by the first valve state and the second valve state;
     determining an activation profile for an associated modulator based on the determined maximum braking pressure; and
   the hardware processor transmitting, via the communication line, the first system brake mode control signal, the second system brake mode control signal and modulator control signals according to the activation profile.

2. The controller as set forth in claim 1, wherein:
   the identified urgency is based on at least one of a current distance to a forward object and a current relative speed of an associated vehicle with respect to the forward object.

3. The controller as set forth in claim 1, wherein:
   the identified urgency is based on a current predicted time until the associated vehicle physically engages the forward object.

4. The controller as set forth in claim 3, wherein:
   if the current predicted time until the associated vehicle physically engages the forward object is not greater than a predetermined time threshold, the processor determines a braking mode is a first braking mode; and
   if the current predicted time until the associated vehicle physically engages the forward object is greater than the predetermined time threshold, the processor determines the braking mode is a second braking mode.

5. The controller as set forth in claim 4, wherein if the braking mode is determined to be the first braking mode, the hardware processor is further capable of:

transmitting the first system brake mode electronic control signal to set the associated first valve to a closed state for not delivering a pneumatic fluid to a pneumatic control port of the associated second valve; and
transmitting the second system brake mode electronic control signal to set the associated second valve to a first state for delivering the pneumatic fluid to an associated modulator at a full system pressure.

6. The controller as set forth in claim 5, wherein if the braking mode is determined to be the second braking mode, the hardware processor is further capable of:
   transmitting the first system brake mode electronic control signal to set the associated first valve to an open state for delivering a pneumatic fluid to the pneumatic control port of the associated second valve at a reduced pressure relative to the full system pressure; and
   transmitting the second system brake mode electronic control signal to set the associated second valve to a second state for delivering the pneumatic fluid to the associated modulator at a pressure proportional to the reduced pressure of the pneumatic fluid delivered to the pneumatic control port of the associated second valve.

7. The controller as set forth in claim 6, wherein:
   the pressure of the pneumatic fluid received by the modulator during the second braking mode is less than the pressure of the pneumatic fluid received by the modulator during the first braking mode; and
   during the second braking mode, the hardware processor is further capable of determining the activation profile as a profile that actuates the modulator to achieve a finer resolution of pressure delivered from the modulator than during the first braking mode.

8. The controller as set forth in claim 7, wherein, the reduced pressure of the pneumatic fluid is ≤~55 psi.

9. A system for controlling automated system braking on a vehicle, the system comprising:
   a service brake, including a supply port, actuated based on a pressure of a pneumatic fluid at the service brake supply port;
   a first valve including a supply port, a delivery port, and an electronic control port, the first valve supply port fluidly communicating with the first valve delivery port based on a state of the first valve based on an electronic control signal received at the first valve electronic control port;
   a second valve including a supply port, a delivery port, and an electronic control port, the second valve supply port fluidly communicating with the second valve delivery port based on a state of the second valve based on an electronic control signal received at the second valve electronic control port;
   a modulator including a supply port, a delivery port and a control port, the modulator supply port fluidly communicating with the modulator delivery port based on a modulator control signal at the modulator control port, and the modulator delivery port fluidly communicating with the service brake supply port; and
   a controller capable of i) transmitting a first valve electronic control signal to the first valve electronic control port, ii) transmitting a second valve electronic control signal to the second valve electronic control port, and iii) determining an activation profile for the modulator during an automated system braking event based on the respective states of the first valve and the second valve, and transmitting the modulator control signal to the modulator control port for controlling the modulator according to the activation profile during the automated system braking event.

10. The system as set forth in claim 9, wherein:
the first valve electronic control port electrically communicates with the controller; and
the second valve electronic control port electrically communicates with the controller.

11. The system as set forth in claim 9, wherein:
the modulator control port is an electronic port electrically communicating with the controller;
the modulator control signal is an electronic signal; and
the controller is capable of transmitting a plurality of the modulator control signals to the modulator control port for controlling the modulator according to the activation profile.

12. The system as set forth in claim 9, wherein:
the controller is capable of receiving a system brake request control signal representing a requested system brake application and an identified urgency;
the controller determines a maximum braking pressure to be applied during the system braking application based on the identified urgency; and
the controller transmits the second valve electronic control signal for setting the state of the second valve based on the identified urgency.

13. The system as set forth in claim 12, wherein:
the identified urgency is one of a high urgency and a low urgency; and
if the identified urgency is the high urgency, the controller transmits the second valve electronic control signal for setting the state of the second valve to a full system pressure state, during which the pneumatic fluid at the full system pressure is fluidly communicated from the second valve supply port to the second valve delivery port.

14. The system as set forth in claim 13, wherein:
the second valve further includes a delivery control port fluidly communicating with the first valve delivery port; and
if the identified urgency is the low urgency:
the controller transmits the first valve electronic control signal for setting the state of the first valve to an open state; and
the controller transmits the second valve electronic control signal for setting the state of the second valve to a proportional pressure state, during which a pressure of the pneumatic fluid delivered to the second valve delivery port is proportional to a pressure at the second valve delivery control port.

15. The system as set forth in claim 14, wherein:
the pressure of the pneumatic fluid at the second valve delivery port decreases when the pressure at the second valve delivery control port decreases.

16. The system as set forth in claim 14, wherein:
while the second valve is in the proportional pressure state during the automated braking system event, the controller transmits the modulator control signals to the modulator control port based on a reduced pressure activation profile; and
the modulator delivery port fluidly communicating the pneumatic fluid at the reduced second valve delivery pressure to the service brake supply port according to the reduced pressure activation profile.

17. The system as set forth in claim 14, wherein:
the first valve supply port fluidly communicates with the pneumatic fluid at the full system pressure; and
if the identified urgency is the low urgency, the controller transmits the first valve electronic control signal for setting the state of the first valve to an open state, during which the pneumatic fluid is reduced from the full system pressure, while fluidly communicated from the first valve supply port to the first valve delivery port, to a reduced first valve delivery pressure that is fluidly communicated to the second valve delivery control port.

18. A method for controlling brakes on a vehicle, the method comprising:
receiving an automated system brake request control signal, representing a requested system brake application and an identified urgency;
determining a maximum braking pressure to be applied during the system braking application based on the identified urgency;
transmitting a first system brake mode electronic control signal to an associated first valve to set the first valve state based on the identified urgency;
transmitting a second system brake mode electronic control signal to an associated second valve to set the second valve state based on the identified urgency, the maximum braking pressure during the automated system braking application being set by the first valve state and the second valve state;
determining an activation profile for an associated modulator during an automated system braking event based on the determined maximum braking pressure; and
transmitting modulator control signals to achieve the activation profile during the automated system braking event.

19. The method as set forth in claim 18, further including:
identifying the urgency as one of a high urgency and a low urgency.

20. The method as set forth in claim 19, further including:
if the identified urgency is high, determining the maximum braking pressure to be a full system pressure; and
if the identified urgency is low, determining the maximum braking pressure to be a reduced system pressure.

21. The method as set forth in claim 20, further including:
if the maximum braking pressure is the full system pressure, determining a braking mode is a first braking mode; and
if the maximum braking pressure is the reduced system pressure, determining the braking mode is a second braking mode.

22. The method as set forth in claim 21, further including if the braking mode is determined to be the first braking mode:
setting the associated first valve to a closed state for not delivering a pneumatic fluid to a pneumatic control port of the associated second valve; and
setting the associated second valve to a first state for delivering the pneumatic fluid to an associated modulator at a full system pressure.

23. The method as set forth in claim 22, further including if the braking mode is determined to be the second braking mode:
setting the associated first valve to an open state for delivering a pneumatic fluid to the pneumatic control port of the associated second valve at a reduced pressure relative to the full system pressure; and
setting the associated second valve to a second state for delivering the pneumatic fluid to the associated modulator at a pressure proportional to the reduced pressure of the pneumatic fluid delivered to the pneumatic control port of the associated second valve.

24. The method as set forth in claim 23, further including: determining the activation profile as a profile that actuates the modulator to achieve a finer resolution of pressure delivered from the modulator than during the first braking mode, the pressure of the pneumatic fluid received by the modulator during the second braking mode being less than the pressure of the pneumatic fluid received by the modulator during the first braking mode.

25. The method as set forth in claim 24, further including: setting the reduced pressure to ≤~55 psi.

\* \* \* \* \*